United States Patent [19]

Drexler

[11] Patent Number: 4,810,868
[45] Date of Patent: Mar. 7, 1989

[54] ERASABLE OPTICAL WALLET-SIZE DATA CARD

[75] Inventor: Jerome Drexler, Los Altos Hills, Calif.

[73] Assignee: Drexler Technology Corporation, Mountain View, Calif.

[21] Appl. No.: 72,307

[22] Filed: Jul. 13, 1987

Related U.S. Application Data

[63] Continuation-in-part of Ser. No. 763,028, Aug. 6, 1985, Pat. No. 4,680,456, which is a continuation-in-part of Ser. No. 673,573, Nov. 21, 1984, Pat. No. 4,542,288, which is a continuation-in-part of Ser. No. 566,966, Dec. 29, 1983, Pat. No. 4,500,777, which is a continuation-in-part of Ser. No. 492,691, May 11, 1983, abandoned, which is a continuation-in-part of Ser. No. 238,833, Feb. 27, 1981, abandoned.

[51] Int. Cl.⁴ ............................................. G06K 19/00
[52] U.S. Cl. ..................................... 235/487; 235/454; 346/76 L; 350/3.61; 365/106
[58] Field of Search ............... 235/487, 488, 456, 468, 235/470, 440, 454; 346/76 L, 135.1; 283/74, 94, 904; 365/106

[56] References Cited

U.S. PATENT DOCUMENTS

| | | | |
|---|---|---|---|
| 3,530,441 | 9/1970 | Ovshinsky | 340/173 |
| 3,873,813 | 3/1975 | Lahr et al. | 235/61.12 |
| 4,190,843 | 2/1980 | Spong | 346/1.1 |
| 4,197,986 | 4/1980 | Nagata | 235/379 |
| 4,202,491 | 5/1980 | Suzuki | 235/491 |
| 4,209,804 | 6/1980 | Dil | 358/128.5 |
| 4,224,666 | 9/1980 | Giraud | 364/200 |
| 4,300,143 | 11/1981 | Bell et al. | 346/135.1 |
| 4,304,990 | 12/1981 | Atalla | 235/380 |
| 4,305,081 | 12/1981 | Spong | 346/135.1 |
| 4,313,188 | 1/1982 | Bartolini et al. | 369/109 |
| 4,345,261 | 8/1982 | Wilkinson | 346/76 |
| 4,357,616 | 11/1982 | Terao et al. | 346/135.1 |
| 4,425,570 | 1/1984 | Bell et al. | 346/135.1 |
| 4,493,887 | 1/1985 | Peeters et al. | 430/275 |
| 4,500,777 | 2/1985 | Drexler | 235/487 |
| 4,527,173 | 7/1985 | Gupta et al. | 346/135.1 |
| 4,542,288 | 9/1985 | Drexler | 235/487 |
| 4,544,181 | 10/1985 | Maurer et al. | 346/76 L |

OTHER PUBLICATIONS

Bartolini et al., Review and Analysis of Optical Recording Media, Mar. 1976.

*Primary Examiner*—A. D. Pellinen
*Assistant Examiner*—Leon K. Fuller
*Attorney, Agent, or Firm*—Thomas Schneck

[57] ABSTRACT

A data card having an optical recording medium formed by an erasable layer atop a polymer layer with prerecorded indicia, all atop a card base. The polymer layer has surface contours which constitute prerecorded indicia. The erasable layer disposed over the polymer layer displays the prerecorded indicia for reading, together with information on the erasable strip. The erasable material may be magnetooptical material, amorphous-crystalline material or liquid crystal material.

12 Claims, 2 Drawing Sheets

ERASABLE OPTICAL WALLET-SIZE DATA CARD

CROSS REFERENCE TO RELATED APPLICATION

This application is a continuation-in-part of prior applications Ser. No. 763,028 filed Aug. 6, 1985, now U.S. Pat. No. 4,680,456, which was a continuation-in-part of application Ser. No. 673,573, filed Nov. 21, 1984, now U.S. Pat. No. 4,542,288, which is a continuation-in-part of prior application Ser. No. 566,966, filed Dec. 29, 1983, now U.S. Pat. No. 4,500,777, which was a continuation-in-part of prior application Ser. No. 492,691, filed May 11, 1983, now abandoned, which was a continuation-in-part of prior application Ser. No. 238,833, filed Feb. 27, 1981, now abandoned.

TECHNICAL FIELD

The invention relates to optical information storage.

BACKGROUND ART

Dil, in U.S. Pat No. 4,209,804, teaches a reflective information recording structure which contains prepressed V-shaped grooves in which data may be recorded by local melting of the reflective metal coating by a laser. The data on the media is read by means of optical phase shift effects. Since the preformed grooves are at an optical phase depth of 95° to 140°, the reading laser must be of the precise wavelength corresponding to the groove depth. The information area has a width of approximately 0.6 microns, so a thick protective substrate, usually 1200 microns deep is used to ensure that one micron surface dust particles are out-of-focus for the read beam.

Such thick protective materials cannot be used for wallet cards which have a total thickness of only 800 microns under ISO (International Standards Organization) standards and further it would be uncomfortable to carry a rigid card in trouser pockets or wallets. It is also impractical to melt large holes since a large lip would be formed around the hole causing a great distortion of the phase shift. Edge transition of the hole is the phase shift which is measured, and since the height of the lip is directly proportional to the square root of the hole diameter, phase shift reading is only practical for small holes. For example, a 25 micron diameter hole creates a lip with one micron height, which is much larger than the wavelength of the reading beam. Thus for large holes and bonded protective materials it is desirable to have a recording/reading structure that does not rely entirely on phase shifts.

Lahr in U.S. Pat. No. 3,873,813 teaches a debit card in which use is indicated by alteration of a spot of heat sensitive coating in a selected area thereby permanently changing the reflective characteristics of that area. A reflective heat sensitive material becomes transparent on heating, thereby exposing an underlying strip of black paper which then absorbs the light energy. Recording requires exposure to a high intensity light beam for 0.7 second to raise the temperature of the material to 175° F. and an additional 5 milliseconds above 175° F. This type of credit card system permits recording of less than two data bits per second. Because of the related, diffused liquid, the sizes of the data spots are large and difficult to regulate. This card requires a blue read beam, therefore scratches and surface dust will cause a large number of data errors unless very large data spots are used that reduce capacity to under 10,000 bits. While this data capacity is satisfactory for some debit and credit cards, it is unsuitable for detailed recording of financial, insurance, medical and personal records. Also, the recording rate of less than two bits per second would make it unacceptable for use in most applications. Another disadvantage of this card is that all of the data is destroyed if its temperature reaches 175° F., for example on the dashboard of a car or if passed through a household washer and dryer.

Nagata in U.S. Pat. No. 4,197,986, Girard in U.S. Pat. No. 4,224,666 and Atalla in U.S. Pat. No. 4,304,990 teach updating of data cards. Nagata teaches the updating of maximum limits and balance on a card in which the complete data file is in an auxiliary memory circuit such as a magnetic disc or drum. A sales slip containing the transaction is recorded separately from the card. Giraud teaches a data-processing machine-access card containing an integrated circuit chip with a memory bank. The memory stores predetermined items of confidential data intended to authorize or prevent access to the machine. Only the balance is updated.

Atalla teaches a card in which only the balance is recorded and updated. This card can only be used where the transaction system is connected to a central computer. None of these cards has the memory storage capacity needed to accumulate records of past transactions.

Gupta et al. in U.S. Pat. No. 4,527,173 teach an erasable, reusable recording medium having a heat-deformable optical recording layer with a transparent overcoat.

In U.S. Pat. No. 3,530,441, Ovshinsky teaches an erasable recording medium wherein amorphous silicon is locally converted to crystalline silicon with concomitant changes in optical reflectivity.

In U.S. Pat. No. 4,425,570 Bell et al. teach an erasable optical recording medium composed of a metallic granular material in a dielectric matrix. The metal particles are of a type which absorb light at the recording wavelength and reversably switch from an original state to a second state having different optical properties at a readout wavelength. An erasing light beam or heat is able to restore the material to its original condition.

Various recording media have been developed for use on a rotating disc format. Because the disc is spinning rapidly, short laser pulse times (on the order of 500 nanoseconds) are necessary to confine the heating to small spots. The media have been developed to increase the sensitivity to the beam by varying the parameter of media absorptivity. Spong in U.S. Pat. Nos. 4,190,843 and 4,305,081 puts an absorptive dye layer over a reflective aluminum layer. Spots are recorded by ablation of the dye layer exposing the underlying reflective layer. Bell in U.S. Pat. No. 4,300,143, teaches a similar technique. Bartolini in U.S. Pat. No. 4,313,188 adds a protective layer between the dye layer and the reflective layer. Wilkinson in U.S. Pat. No. 4,345,261 uses a light absorptive silica dielectric layer in place of the dye layer. Terao in U.S. Pat. No. 4,357,616 teaches an inorganic absorptive layer over an organic recording film layer. Holes are formed in the film layer by heat generated in the absorptive layer. Suzuki in U.S. Pat. No. 4,202,491 uses a fluorescent ink layer on which data spots emit infrared radiation. Magnetooptical erasable laser recording materials are also known in the art. For example, see U.S. Pat. No. 4,493,887 to Peeters et al. Improved sensitivity is obtained in these media at the expense of extra layers which increase complexity and cost. This increased sensitivity is not necessary for a card format.

DISCLOSURE OF INVENTION

It is the object of the present invention to devise a wallet-size plastic data card containing a reusable laser recordable strip and a system for sequential recording transaction data on the data card with a laser where the data on the card may be read optically. It is also an object of the invention to perform related sequential laser recording of transactions and events related to the fields of insurance, personal medical records, personal information, banking and related data records.

It is a further object of the invention to devise a wallet-size card, containing a laser recordable strip, that meets the ISO dimensions for plastic credit cards, has a capacity of at least 250,000 bits, can record data at thousands of bits per second and contains prerecorded information such as reference position on the strip.

These objects were met with a wallet-size sealed plastic card only 800 microns thick containing an erasable laser recordable strip using data spots up to 25 microns in size to minimize reading errors. An underlying layer, which is read through the recording layer, for example by surface contours which are followed by the recording layer, contains prerecorded information, such as reference position information. The data system of the present invention relies on reading of optical contrast ratios from laser recorded user data and prerecorded information or phase related reading of prerecorded information. The card is formed by first prerecording information on the underlayer, covering the underlayer with a recording layer, and bonding protective, transparent material over the recording strip and then recording transaction information or records with a laser. The prerecording can be done by laser recording or surface molding, preferably on a photopolymer or other polymer underlayer, respectively.

The recording strip is erasable and may be amorphous to crystalline transition material which has two states of different optical or electrical properties; a magnetooptical material which is written magnetically, but read by detecting a shift in the angle of polarized light; or a liquid crystal material which has two states or different optical scattering.

One of the chief advantages of the present invention is the high information capacity of laser recording media strips. Typically, high resolution laser recording materials record spots of altered reflectivity optically contrasting with the surrounding reflective field and having dimensions less than 25 microns. A high capacity laser recording material strip enables a financial card to carry the equivalent of scores of pages of text, more than ample for most applications. The transaction card of the present invention is suitable for accumulating sequentially recorded data involving financial transactions, insurance transactions, medical information and events, and personal information and identification. It is also capable of being erased and rewritten.

BEST MODE FOR CARRYING OUT THE INVENTION

Figures 1, 2:
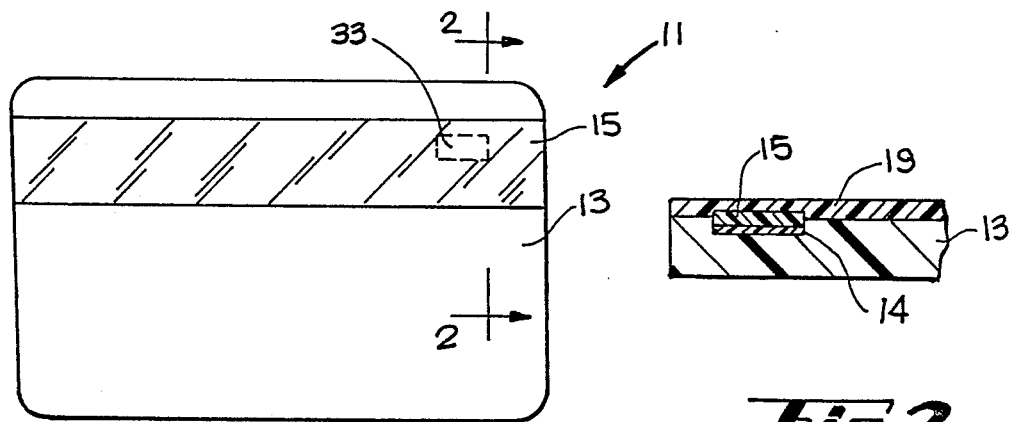
FIG. 1 is a plan view of one side of a data card in accord with the present invention.
FIG. 2 is a partial side sectional view taken along lines 2—2 in FIG. 1.

With reference to FIGS. 1 and 2, a data card 11 is illustrated having a size common to most credit cards. The width dimension of such a card is approximately 54 mm and the length dimension is approximately 85 mm. These dimensions are not critical, but preferred because such a size easily fits into a wallet and has historically been adopted as a convenient size for automatic teller machines and the like. The card's base 13 is a dielectric, usually a plastic material such as polyvinyl chloride or similar material. Polycarbonate plastic is preferred. The surface finish of the base should have low specular reflectivity, preferably less than 10%. A major surface of base 13 carries an underlayer or a sublayer 14 which is a photopolymer, such as photoresist. Permanent patterns are made in the photopolymer for prerecording nonerasable information, such as servo tracks, control, timing indicia and fixed data. Typically, surface relief patterns are formed in the photopolymer with a characteristic maximum height above the base. This prerecording is accomplished analogously to the prerecording of such indicia on video disks. The recording strip 15 is disposed directly over and in intimate contact with sublayer 14. The polymer underlayer 14 may extend the full width and length of the card or less.

The recording strip is typically 16 or 35 millimeters wide and extends the length of the card. Alternatively, the strip may have other sizes and orientations, and may extend the full width and length of the card. The strip is relatively thin, approximately 100–500 microns, although this is not critical. The strip may be applied to the card by any convenient method which follows the contours of the underlying material such as vapor deposition. Metallic recording strips or areas may be vapor deposited or sputtered onto the photopolymer underlayer so long as the prerecorded underlayer can be read from the strip 15 such as by reading phase-shifts. Sheet 19 is a thin, transparent plastic sheet laminating material or a coating, such as a transparent lacquer. The material is preferably made of polycarbonate plastic.

The opposite side of base 13 may have user identification indicia embossed on the surface of the card. Other indicia such as card expiration data, card number and the like may be optionally provided.

The recording strip 15 may be any suitable reusable data recording material readable with a laser. One class of such materials are magnetooptical recording media of the type described in U.S. Pat. No. 4,670,353 to Sakurai. The described materials are terbium-iron-cobalt amorphous films having a thickness of about 300 Å on a transparent substrate or base. This material is written magnetically, but read optically with polarized light. In use, the material surface is uniformly magnetized. A writing beam heats spots to near material melting temperature where magnetization is reversed with a local magnetic field. A lower power beam is used for reading the spots which reflect and scatter light differently than the surrounding field.

A second erasable recording material consists of liquid crystal film of the type described in U.S. Pat. No.

4,405,993 to Kahn et al. Laser writing is accomplished by locally heating liquid crystal material with a pulsed optical beam to create radiation scattering defects forming a desired bit pattern. By subsequently reheating the local defects, it is possible to recrystallize the material, thereby erasing previously written spots.

A third type of laser recording material is amorphous to crystallize transition material of the type described in U.S. Pat. No. 4,576,895 to Barton et al. In this type of material, heating above a critical temperature and rapid cooling of the material causes a reversible transition in crystal structure. Erasing is accomplished by reheating and cooling.

Figure 3:
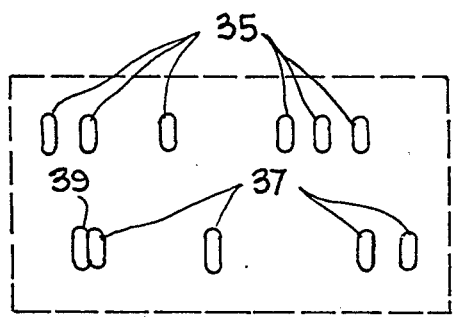
FIG. 3 is a detail of laser writing on a portion of the laser recording strip illustrated by dashed lines in FIG. 1.

The material should also be capable of recording at speeds of at least several thousand bits/sec. This generally precludes the use of materials that require long heating times or that rely on slow chemical reactions in the presence of heat, which may permit recording of only a few bits/sec. Data is recorded by forming spots in the surrounding field of the reflective layer itself, thereby altering the reflectivity in the data spot. Data is read by detecting the optical reflective contrast between the surrounding reflective field of unrecorded areas and the recorded spots. Spot reflectivity of less than half the reflectivity of the surrounding field produces a contrast ratio of at least two to one, which is sufficient contrast for reading. Greater contrast is preferred. Reflectivity of the strip field of about 40% is preferred with reflectivity of a spot in the reflective field being less than 10%, thus creating a contrast ratio of greater than four to one, although two to one is acceptable. With reference to FIG. 3, a magnified view of laser writing on the laser recording material strip 15 may be seen. The dashed line 33, corresponds to the dashed line 33 in FIG. 1. The oblong spots 35 are aligned in a path and have generally similar dimensions. The spots are generally circular or oval in shape with the axis of the oval perpendicular to the lengthwise dimension of the strip. A second group of spots 37 is shown aligned in a second path. The spots 37 have similar dimensions to the spots 35. The spacing between paths is not critical, except that the optics of the readback system should be able to easily distinguish between paths.

Presently, in optical disk technology, tracks which are separated by only a few microns may be resolved. The spacing and pattern of the spots along each path is selected for easy decoding. For example, oval spots of the type shown can be clustered and spaced in accord with self-clocking bar codes. If variations in the dimensions of a spot are required, such dimensions can be achieved by clustering spots, such as the double spot 39. Such variations are used in the ETAB bar code which is described in U.S. Pat. No. 4,245,152. While the American Banker's Association has not yet adopted any particular code, the strip material is such that many machine and eye readable codes can be accommodated. Some optical codes such as the Universal Product Code are both machine and eye readable. Such codes could also be accommodated, although a great deal more laser writing would be required than with circular or oval spots, and a much lower information density would be achieved. The spots illustrated in FIG. 3 typically have recommended sizes of approximately 5 microns by 20 microns, or 2 microns by 8 microns or circular spots 3 microns to 10 microns in diameter. Generally, the smallest dimension of a spot should be less than 50 microns. In the preferred embodiment the largest dimension would also be less than 50 microns. Of course, the offset lower densities from larger spots, the size of the strip 15 could be expanded to the point where it covers a large extent of the card. In FIG. 1, the laser recording strip 15 could completely cover a single side of the card. A minimum information capacity of 250,000 bits is indicated and a storage capacity of over one million bits is preferable.

Figure 4:
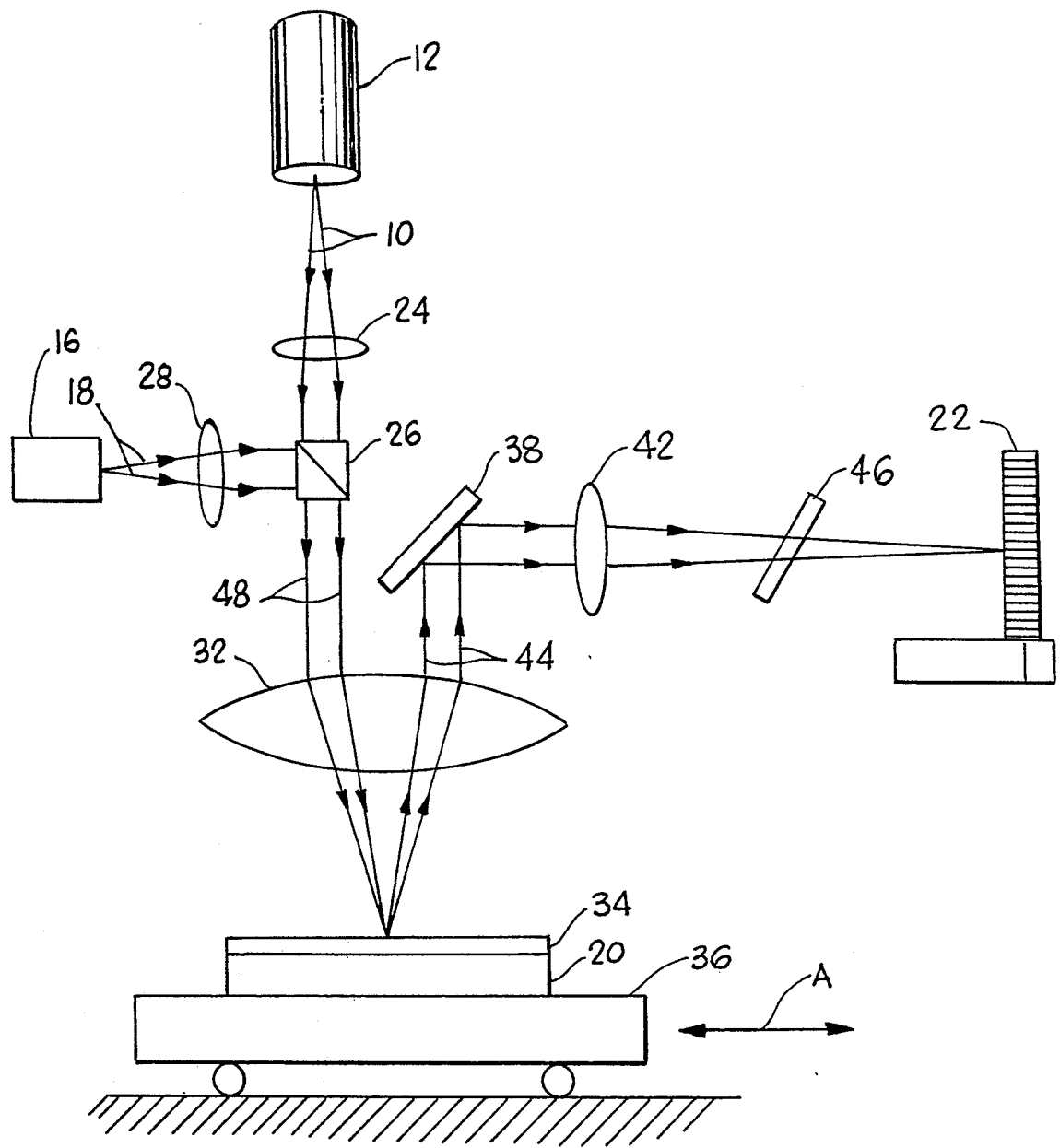
FIG. 4 is a plan view of an apparatus for reading and writing on the optical recording media strip illustrated in FIG. 1.

In FIG. 4, a side view of the lengthwise dimension of a card 41 is shown. The card is usually received in a movable holder 36 which brings the card into a beam trajectory of a laser 12 capable of emitting a modulated laser beam. A second light source 16 emits a second beam 18. Optical elements direct beams 14 and 18 to card 20, and at least one detector 22 reads data on card 20.

Laser 12 is used only for writing data spots on card 20 and during data reading is kept below the threshold for writing on the medium. Beam 14 should, when writing, deliver sufficient laser pulse energy to the surface of the recording material to creates spots. Typically, 5-20 milliwatts is required, depending on the recording material. A 20 milliwatt semiconductor laser, focused to a five micron beam size, records at temperatures of about 200° C. and is capable of creating spots in less than 25 microseconds. Other laser beams, focused to one to ten micron beam diameters, are also capable of recording spots on optical storage media. The wavelength of the laser should be compatible with the recording material.

Second light source 16 is preferably a light emitting diode (LED) or semiconductor laser, and is used for reading data spots on card 20 and for tracking, clocking and focusing. LED 16 emits low intensity beam 18 during both reading and writing. Second light source 16 may also be a defocused laser 23.

Laser beam 10 is directed through a lens 24 to a beam splitter 26. Beam 18 from LED 16 is directed through a lens 28 to beamsplitter 26. Beams 10 and 18 entering beamsplitter 26 emerge as a combined beam sharing a slightly displaced optical axis 48. Combined beam on axis 48, which beam is made up of a low intensity beam 18 and laser beam 10 at high power during data writing and low or zero power during data reading, is directed through a focusing lens 32 onto card 20. Card 20 is typically provided with a transparent scratch resistant protective coating 34 disposed on the data storage medium on the card. Lens 32 has a focal length so as to bring laser beam 10 to a narrow spot on the order of one to ten micrometers in diameter on card 20. Lens 32 typically has a three to four millimeter focal length. Beam 18 does not focus to a narrow spot but rather illuminates a substantially larger area of the medium on card 20 than beam 10. Typically, beam 18 illuminates an area ranging from a 10 micrometer diameter up to a 60 micrometer diameter. Beam 18 may be elliptical.

Card 20 is supported on a platform 36 movable in a direction indicated by arrow A. Motion of platform 36 provides course scanning in a longitudinal direction along data tracks read through the recording strip on card 20. The system is movable in a direction in and out of the page for course scanning in a lateral direction across data tracks. Fine scanning may be provided by moving one or more optical elements in the system, such as lens 32.

Light illuminating the recording strip on card 20 is reflected from the strip and scattered or absorbed by data spots or prerecorded information on the strip. Light scattered or absorbed from the spots contrasts with the light reflected from the surrounding field where no spots or surface contours exist. The light is then directed to at least one detector 22 by lens 32, a mirror 38, and a lens 42. Lens 32 is shown off-center with respect to optical path 35 so that reflected light returns through lens 32 along a separate optical path 44. This allows a non-polarization sensitive tracking and focusing system to be used to thereby reduce the cost of the medium.

The focal length of lens 42 is determined by the size and configuration of detector 22, and vice versa. The spot on the media should be imaged onto detector elements of detector 22. The magnification of a spot is determined by the focal lengths of lenses 32 and 42. Preferably, the focal length of lens 42 is on the order of 10 mm, but lenses have been used with a focal length as long as 360 mm. In that case, a plurality of turning mirrors, represented by mirror 46, is generally provided to fold the optical path 44 into a compact structure. No such turning mirrors 46 are required for lenses 42 having a focal length of about 10 mm.

I claim:

1. An optical data card comprising,
    a wallet-size plastic card base having opposed major surfaces,
    a photopolymer layer disposed over a major surface of the card base, said layer having surface relief patterns of characteristic maximum height above said major surface therein defining prerecorded information, said prerecorded information formed in a permanent manner in said layer,
    an erasable optical recording layer disposed over at least a portion of the photopolymer layer, and
    a transparent protective layer disposed over the optical recording layer, the protective layer being substantially thicker than said characteristic height.

2. The data card of claim 1 wherein said erasable recording layer comprises magnetooptical material.

3. The data card of claim 1 wherein said erasable recording layer comprises a film capable of amorphous to crystalline transitions.

4. The data card of claim 1 wherein said erasable recording layer is a liquid crystal material.

5. The data card of claim 1 wherein said photopolymer is photoresist.

6. The data card of claim 1 wherein said surface relief pattern comprises a plurality of ridges extending over portions of said major surfaces.

7. In a data card of the type having a wallet-size plastic card base with opposed major surfaces, the improvement comprising,
    a photopolymer underlayer disposed over a major surface of the card base, said layer having prerecorded information defined therein, said prerecorded information being defined in a permanent manner,
    an erasable optical recording layer disposed over at least a portion of the photopolymer layer, said erasable layer revealing underlying prerecorded information, and
    a transparent protective layer disposed over the optical recording layer.

8. The data card of claim 7 wherein said erasable recording layer comprises magnetooptical material.

9. The data card of claim 7 wherein said erasable recording layer comprises a film capable of amorphous to crystalline transitions.

10. The data card of claim 7 wherein said erasable recording layer is a liquid crystal material.

11. The data card of claim 7 wherein said photopolymer is photoresist.

12. In a data card of the type having a wallet-size plastic card base with opposed major surfaces, the improvement comprising,
    a photoresist underlayer disposed over a major surface of the card base, said layer having prerecorded information defined therein by relief-type patterns of characteristic maximum height above said major surface, said prerecorded information being defined in a permanent manner,
    an erasable optical recording layer comprising magnetooptical material disposed over at least a portion of the photoresist layer, said erasable layer revealing underlying prerecorded information, said prerecorded information being unchanged during erasing of said optical recording layer, and
    a transparent protective layer disposed over the optical recording layer.

* * * * *